Figure 2:
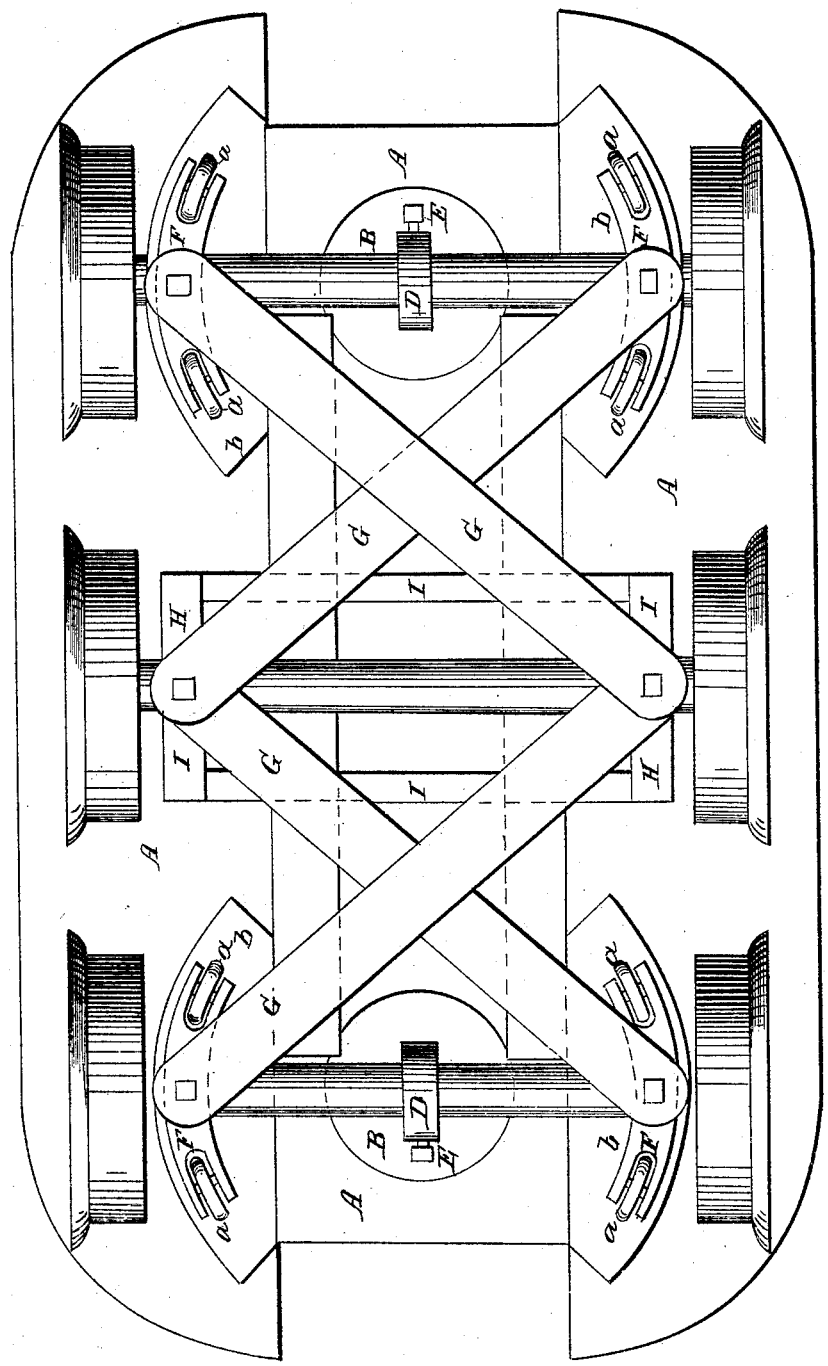

B. HINKLEY.
Car Truck.
No. 8,560.
2 Sheets—Sheet 1.
Patented Dec. 2, 1851.
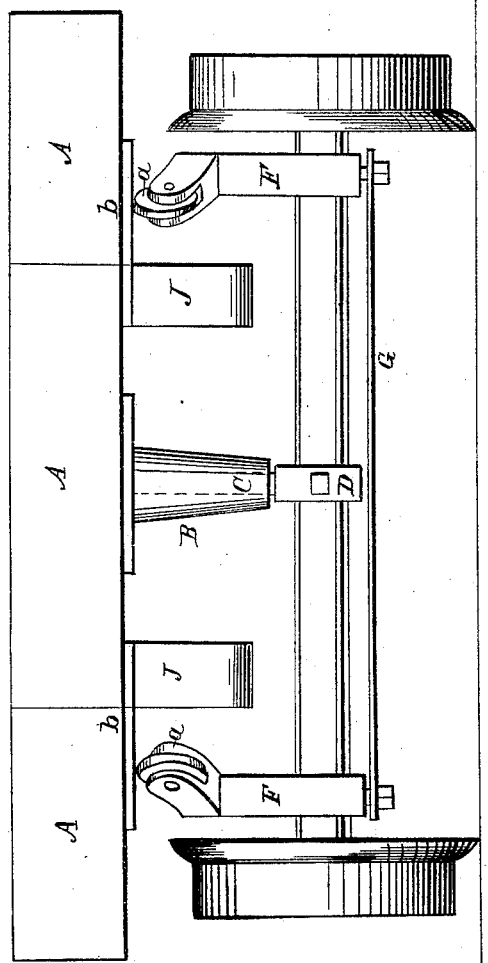
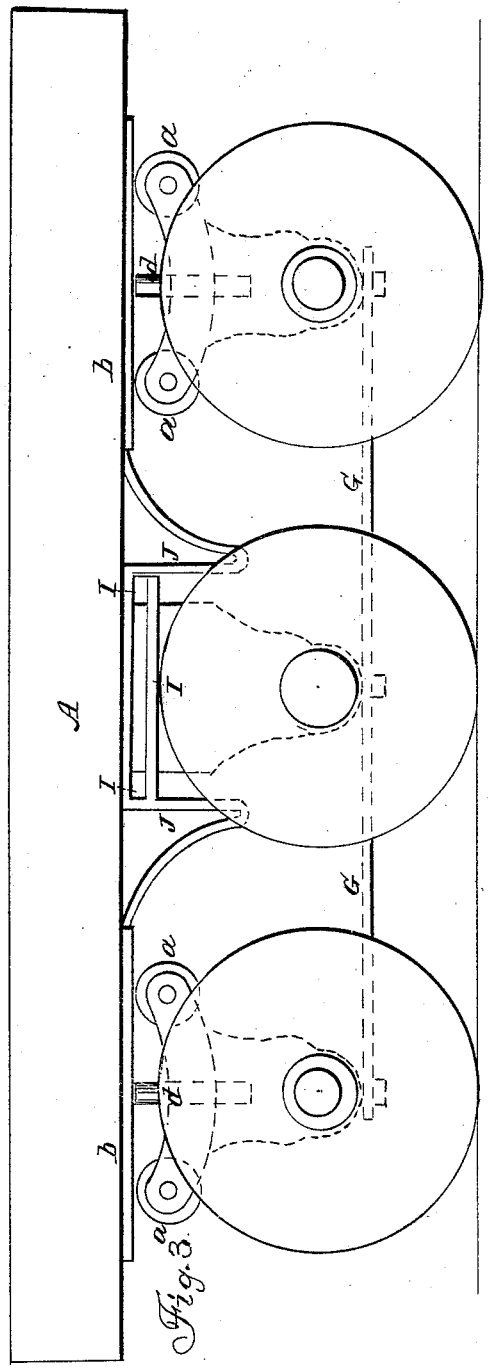

B. HINKLEY.

Car Truck.

No. 8,560.

2 Sheets—Sheet 2.

Patented Dec. 2, 1851.

UNITED STATES PATENT OFFICE.

BENJ. HINKLEY, OF TROY, NEW YORK.

RAILROAD-CAR TRUCK.

Specification of Letters Patent No. 8,560, dated December 2, 1851.

*To all whom it may concern:*

Be it known that I, BENJAMIN HINKLEY, of Troy, in the county of Rensselaer and State of New York, have invented certain new and useful Improvements in Car Trucks; and I do hereby declare the following to be a full, clear, and exact description of the same, reference being had to the accompanying drawings, making part of the same, in which—

Figure 1, represents an end view, Fig. 2, represents a bottom view, and Fig. 3, a side view of the same.

Similar letters in the several figures represent the same parts.

The nature of my invention consists, in hanging the front and rear axles on their centers, so as to turn in a socket suspended to the underside of the frame of the truck, and connecting them to the center axle, which slides in stationary guides underneath said frame, by cross braces, for the purpose of adjusting, and holding or bracing when so adjusted, the wheels of the truck to any curvature in the road, and also for holding any one of the set of wheels, so long as the other two sets remain on the track, in proper position for dropping onto the track, when raised to surmount any obstruction which may accidentally be placed thereon.

To enable others skilled in the art to make and use my invention, I will proceed to describe the same with reference to the drawings.

The frame A, of the truck may be constructed in any well known substantial manner, and of sufficient length to hold the three sets of wheels of which it is made up. Suspended from said frame in front and rear are sockets B, firmly attached thereto, into which are inserted and freely play, the tangs or shanks C, of the collars D, which are slid on and firmly fastened to the centers of the front and rear axles. The collars may be fastened by means of the set screws E, or shrunk on, or in any other secure manner attached to said axles.

The bolsters F, are firmly attached to the axles so as to move with them, and may have friction rollers *a*, in their tops, where they play upon the plate *b*, on the under part of the sides of the truck frame, as the wheels adjust themselves to any curvature in the road. From the underside of each of these bolsters on the front and rear axles, extend the cross braces G, one end of each of which is attached to said front and rear bolsters the other ends being similarly attached to the bottoms of the middle bolsters H, which holds the center axle, said braces crossing each other diagonally, so as to brace the bolsters on the opposite sides from each other, and keep the end axles always in the same relative position to the center one.

The center axle H, is arranged in a frame I, which plays back and forth between the guides J, (firmly attached to the bottom of the frame) as the front and rear wheel adjust themselves to any curvature of the road, by means of the diagonal or cross braces G, and by said cross braces the frame containing the center axle is firmly held in place, and prevented from being moved by any obstruction on top of the rail—the arrangement being such, that while at any time the front and rear axles may stand in such an oblique line to the frame of the truck, as the curvature of the road may require, the center axle will always stand at right angles to said line, and be moved and held by the cross braces G, and guides J, above described.

I have herein described and represented the cross braces as extending from the bottom of the bolsters. If however, it may be found preferable to raise them to the top of the bolster to protect them from any danger arising from obstructions on the road, they may be so arranged, by simply allowing the bolster to come up flush against the friction plate *b*, and by dropping a bolt *d*, through the ends of said cross braces, and into the bolsters, the same result will be attained. In this as well as the before described method, the friction rollers may be used or dispensed with entirely, as in practice it is found that the bolsters will move with sufficient ease upon the friction plate *b*, alone.

The truck is necessarily constructed with three sets of axles and wheels, so that the outside axles may direct and control the center one. There may be however duplicates of these sets, and still retain the same effect. But three sets of wheels will be found sufficient for any common truck.

I have represented and described the wheels as being loose on the axles. But if preferred, the wheels and axles may turn together, and the same result attained (viz: allowing the axle to hang and turn on its center) by making the collar D, a loose one, and placing a stationary collar on each side of it on the axle.

Besides bracing and holding the center axle to the proper curvature of the road, the diagonal braces perform another very essential service in case any obstruction should be placed upon the road; for so long as any two of the sets of wheels remain on the track, the third one may be raised entirely clear of it, and the cross braces will hold it in the precise position for dropping back again onto the track after passing over said obstruction. For instance, when the first set of wheels rise up to surmount any obstruction, the second and third set, by means of the cross braces retain it in proper position for dropping back on the track, after passing over it. When the second set passes over the first and third set perform the same office, and when the third or last set pass over the first and second set hold it in proper position for dropping back on the track. When either one of the set of wheels raises up, although it may raise up the frame of the truck, yet it does not raise up the other two sets of wheels, the frame being so set upon the axles, as that the front and rear ones by the tangs and sockets and the middle one by the frame and guides, allows the frame to move to a certain extent, up and down without raising the wheels with it, and so that although the weight of the frame may be removed from either set of wheel they still retain their position for guiding the other sets.

Having thus fully described my invention, what I claim therein as new and desire to secure by Letters Patent is—

Hanging the frame of a six-wheel truck immediately on the centers of the front and rear axles by a shank and socket, and to the center axle by guides, in combination with horizontal diagonal or other bracing connecting and operating said wheels, so that they may adjust themselves to any lateral curvature in the track, and at the same time allow either of the sets of wheels to pass over any obstruction without raising the other sets from the track; and for the purpose also of allowing the set from which the weight is removed to still retain its position on the track for guiding the others, as herein fully set forth and described.

BENJA. HINKLEY.

Witnesses:
A. B. HOUGHTON,
S. C. DORIN.